United States Patent
Smith et al.

(10) Patent No.: US 7,387,493 B2
(45) Date of Patent: Jun. 17, 2008

(54) IMPELLER WITH WIDENED BLADES

(75) Inventors: Tyn Suttle Smith, Allegany, NY (US); Donald Warren Johnson, Eldred, PA (US)

(73) Assignee: Dresser-Rand Company, Olean, NY (US)

( * ) Notice: Subject to any disclaimer, the term of this patent is extended or adjusted under 35 U.S.C. 154(b) by 0 days.

(21) Appl. No.: 11/581,309

(22) Filed: Oct. 16, 2006

(65) Prior Publication Data

US 2007/0148001 A1  Jun. 28, 2007

Related U.S. Application Data

(63) Continuation of application No. 10/741,945, filed on Dec. 19, 2003, now Pat. No. 7,121,806.

(51) Int. Cl.
*F01D 5/30* (2006.01)
(52) U.S. Cl. ................ 416/213 R; 29/889.21
(58) Field of Classification Search ........... 416/213 R, 416/204 A; 29/889.21, 889.22
See application file for complete search history.

(56) References Cited

U.S. PATENT DOCUMENTS

| 1,904,421 | A | * | 4/1933 | Doran | 416/213 R |
| 4,201,516 | A | * | 5/1980 | Kolk et al. | 416/213 R |
| 4,704,066 | A | * | 11/1987 | Weissbacher | 416/213 R |

* cited by examiner

*Primary Examiner*—Richard Edgar
(74) *Attorney, Agent, or Firm*—Michael Best & Friedrich LLP

(57) ABSTRACT

A rotary impeller assembly is for a fluid machine and includes a support member having an outer surface and blades connected to the support member. Each blade includes first and second integral portions, the blade first portion having a first thickness and being spaced from the base surface and the blade second portion is disposed against the support member outer surface and has a second thickness. The second thickness is substantially greater than the first thickness such that the blade has greater stiffness proximal to the support and a lesser stiffness generally distal from the support. Preferably, the blades are connected with the support welds between each blade sidewall and the support member. Further, each blade first portion is sized such that the blade first thickness is maintained in a significant area of the blade spaced from the weld(s) so as to allow blade flexure away from the weld.

13 Claims, 1 Drawing Sheet

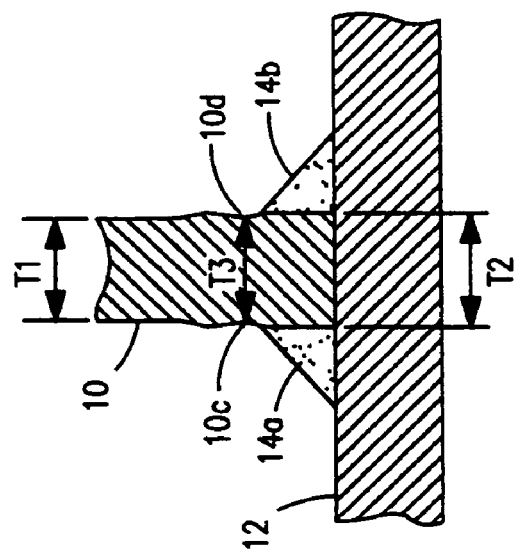
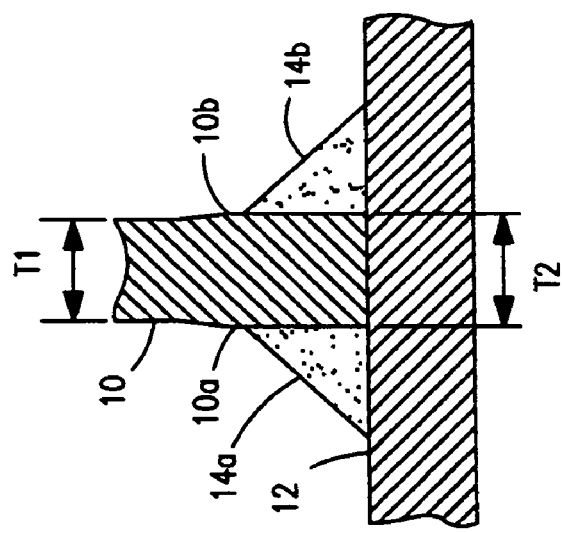
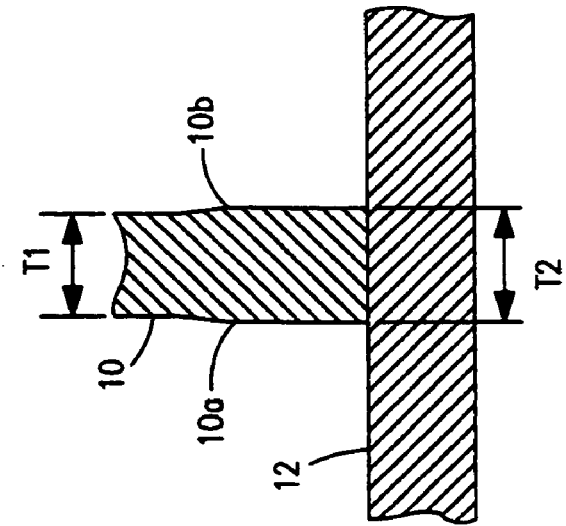

IMPELLER WITH WIDENED BLADES

This application is a continuation of application Ser. No. 10/741,945, filed Dec. 19, 2003 now U.S. Pat. No. 7,121,806, the content of which is incorporated herein by reference.

BACKGROUND

The present invention relates to a method of welding and an assembly formed by the method.

Welding methods are often very critical when an assembly if formed by welding two or more components together. For example, an important consideration in connection with rotary machines including compressors, turbines, refrigeration and gas liquefaction units, and the like, is the design of the impellers since they substantially affect the performance of the machine. A typical radial flow impeller includes a plurality of angularly-spaced blades extending from a central support member, such as a hub or a shroud. However, the blades are often welded to the support member in a manner that results in significant steady state and alternating stresses within the weld joint, and a reduction in fatigue resistance.

Therefore, what is needed is welding technique that eliminates, or at least significantly reduces, the above problems.

BRIEF DESCRIPTION OF THE DRAWINGS

FIGS. 1-3 are sectional views of an impeller depicting three manufacturing steps according to an embodiment of the invention.

DETAILED DESCRIPTION

Referring to FIG. 1, the welding technique according to an embodiment of the present invention will be described, for the purpose of example, in connection with welding an impeller blade 10 that extends perpendicular to, and radially from, a support member 12, which, for the purpose of example, is in the form of a hub or shroud. The blade 10 and the member 12 form a portion of an impeller assembly used in a rotary machines (not shown) such as a compressor, turbine, refrigeration and gas liquefaction unit, and the like. Although not shown in the drawing, it is understood that additional blades, which can include splitter blades and blades similar or identical to the blade 10, also extend from the member 12 in an angularly-spaced relation to the blade 10. The blade 10 is connected to the outer surface of the member along one edge of the blade in a manner to be described.

The thickness, or width, of a major portion of the blade 10, as viewed in FIG. 1, is represented by T1. However, the thickness of the blade 10 increases from the thickness T1 to an increased thickness represented by T2 at an area of the blade spaced from, and in a direction towards, the member 12. As a result, the opposite side walls of the blade 10 have two gradually tapered, or flared, portions 10a and 10b, respectively, extending from the portion of the blade having the thickness Ti to the portion of the blade having the thickness T2. The thickness T2 extends from the lower portions of the tapered portions 10a and 10b to the edge of the blade connected to the member 12.

FIG. 1 depicts a first manufacturing step in the preparation of the blade 10 in accordance with an embodiment of the invention, which includes forming of the blade with the thicknesses T1 and T2 and the tapered portions 10a and 10b, and FIG. 2 depicts a second step. In particular, two welds 14a and 14b are made at the corners between the two side walls of the blade and the corresponding surfaces of the member 12. The welds 14a and 14b extend along the respective walls of the blade 10 from just below the lower portions of the tapered portions 10a and 10b, as viewed in the drawing, to the member 12 and along the corresponding walls of the latter member. The welds 14a and 14b can be in the form of any conventional welds such as a full or partial penetrating fillet welds, or the like.

The final welded assembly is shown in FIG. 3 after an additional manufacturing step. In particular, two concave toes 10c and 10d are formed into the opposite side walls of the blade 10 and into the welds 14a and 14b. The toes 10c and 10d can be formed in any conventional manner such as by cutting, grinding or by a resolidification welding step. The toes 10c and 10d extend from the area of the blade 10 having the thickness T2 just above the welds 14a and 14b, respectively, (often referred to as the "heat affected zone") into the upper portions of the welds. As an example, approximately one half of each toe 10c and 10d extends in the latter area of the blade and the remaining half of each toe extends into the weld. The thickness of the blade 10 as a result of the forming of the toes 10c and 10d is represented by T3. Thus, a generous radius at the weld toes 10c and 10d is permitted without compromising the thickness T3.

As an example of the above dimensions, it will be assumed that the thickness T1 is approximately 0.46 inch, and the thickness T2 is approximately 0.52 inch. Thus each wall of the blade would be 0.03 inch greater in the area having the thickness T2 when compared to the walls in the area having the thickness T1. Each toe 10c and 10d is formed in that portion of the blade having the increased thickness T2, and each toe is formed to a depth of approximately 0.03. Therefore, the thickness T3 of the blade 10 at the toes 10c and 10d, is equal to the thickness T2 (0.52 inch) reduced by 0.06 inch to a value of 0.46 which is approximately equal to the thickness T1. Thus, the toes 10c and 10d are formed without undercutting, or reducing, the thickness T1.

According to another example, it will be assumed that the thickness T1 is approximately 0.46 inch, and the thickness T2 is approximately 0.52 inch, as in the previous example. In this case, each toe 10c and 10d would extend to a maximum depth of 0.025 inch, to form a thickness T3. Since portions of the toes 10c and 10d are formed in that portion of the blade having the increased thickness T2, the thickness T3 is equal to the thickness T2 (0.52 inch) reduced by 0.05 inch to a value of 0.47 which is slightly greater that the thickness T1. Thus, the toes 10c and 10d are formed without undercutting, or reducing, the thickness T1.

It is emphasized that the dimensions of the thicknesses T1, T2, and T3, as well as the depth of the toes 10c and 10d, as set forth above, are only for the purpose of example and that they can vary within the scope of the invention.

It can be appreciated that the blade 10 can be positioned relative to the member 12 with the lower edge of the blade engaging a corresponding surface of the member as viewed in the drawings at any stage of the above sequence of steps, and that the blade is shown so positioned relative to the member in all three figures for the convenience of presentation. Also, it is understood that the depth, or length, of the toes 10c and 10d and the welds 14a and 14b can extend for the entire length of the blade 10.

It is understood that toes can also be made in the surfaces of the member 12 adjacent the welds 14a and 14b, and that the thickness of the member 12 can be increased accordingly to accommodate the latter toes without undercutting the member 12 in the same manner as discussed above in connection with the member 10.

As a result of the above, the weld joints have extra material for stress reduction, yet the relative low thickness T1 can be maintained in a significant area of the blade 10 spaced from the welds 14a and 14b, which thickness is ideal from a design standpoint to allow flexure away from the welds that reduces bending stress and overall aerodynamic blockage, and permits operation at a higher centrifugal speed. Levels of stresses on the weld joing, such as bending stress, tensile stress, local stress concentration, as well as alternating and mean stress levels, are thus reduced along with susceptibility to quench, heat treatment, and overspeed (proof testing) cracking. Also, increased fatigue resistance and the lives of the weld joints and subsequently the overall assembly is achieved. Still further, grinding tolerances and flexibility are increased without degrading weld joint performance, and relative large shot size can be used when shot preening for more fatigue resistance. The relative small thickness T1 is maintained in a significant area of the blade 10 spaced from the welds 14a and 14b, which thickness is ideal from a design standpoint to allow flexure away from the joint that reduces overall joint stress and reduces overall aerodynamic blockage.

The above technique allows improved sensitivity and flaw identification using non-destructive inspection techniques such as wet or dry magnetic particle or dye penetrant techniques. Overall, this technique also allows the analysis effort for fatigue and other failure mechanisms to move away from a fracture mechanics approach towards a continuum approach for a welded structure.

VARIATIONS

It is understood that variations may be made in the above without departing from the scope of the invention. Examples of the variations are as follows:

1. The above embodiment is not limited to the welding of a blade to a support member, but is equally applicable to the welding of other types of components to form a welded assembly.

2. The above embodiment is not limited to joining two members at a 90-degree angle but rather the angle between the members can vary from a relatively large acute angle to a relatively large obtuse angle.

3. The sequence of at least some the manufacturing steps shown in FIGS. 1-3 can be changed.

4. The above-mentioned specific dimensions of the members discussed above, including the dimensions of the thicknesses T1, T2, and T3 as well as the radii of the toes 10c and 10d can be varied within the scope of the invention.

5. Spatial references, such as "side", "edge", "radial", "angular" "perpendicular" "below", etc., are for the purpose of illustration only and do not limit the specific spatial orientation of the structure described above.

6. A weld toe, of the above type, can be formed in only one side wall of the blade.

7. The shape of the blade 10 at both thicknesses T1 and T2 can vary and, for example, could take an "hourglass" shape in which the width of the blade is variable along its length in a directions towards the member.

8. The shape of the welds 14a and 14b can be different than illustrated in the drawings, and, as such, could have different convexity or shaped hypotenuse.

9. Toes, similar to the toes 10c and 10d could be formed in the support member 12 and welds 14a and 14b in the same manner as described above in connection with the blade 10, in which case the corresponding dimensions of the support member 12 would be modified, such as widened, to accommodate the toes.

10. The welds and the toes discussed above can be made in only one wall of the blade 10 rather than in the opposed walls as shown.

11. The relative portions of each weld and the blade that are reduced during the formation of the weld toes 10c and 10d can vary.

12. The above welds and toes have been shown, for the purpose of example in connection with the side walls or edges of the blade 12, and it is understood that they could also be applied to the leading (front) and trailing (rear) walls or edges.

Although only one exemplary embodiment has have been described in detail above, those skilled in the art will readily appreciate that many other variations and modifications are possible in the exemplary embodiment without materially departing from the novel teachings and advantages of this invention. Accordingly, all such variations and modifications are intended to be included within the scope of this invention as defined in the following claims. In the claims, means-plus-function clauses are intended to cover the structures described herein as performing the recited function and not only structural equivalents, but also equivalent structures.

What is claimed is:

1. A rotary impeller assembly for a fluid machine, the impeller assembly comprising:

a support member having an outer surface; and at least one blade including first and second integral portions and two opposite side walls, the blade being connected to the support member by at least one weld made between one side wall and the support member outer surface so as to form a weld joint, the blade first portion having a first thickness between the two side walls and being spaced from the support member surface, the blade second portion having an edge extending between the two side walls, the edge being disposed against the support member outer surface, the second portion having a second thickness between the two side walls, the second thickness being greater than the first thickness such that the weld joint has extra material for stress reduction and the thickness of the blade first portion allows flexure away from the weld joint, the blade second portion having a height extending between the blade first portion and the edge, the height being greater than the second thickness.

2. The impeller assembly as recited in claim 1 wherein the blade first portion is a major portion of the blade.

3. The impeller assembly as recited in claim 1 wherein each blade is connected with the blade by two welds each made between each blade side wall and a corresponding surface of the support member.

4. The impeller assembly as recited in claim 1 wherein the blade has a leading edge and a trailing edge and the blade is connected with the support member by at least one weld at one of the blade leading edge and the blade trailing edge.

5. The impeller assembly as recited in claim 1 wherein the blade first portion is sized such that the blade first thickness is maintained in a significant area of the blade spaced from the at least one weld so as to allow blade flexure away from the weld.

6. The impeller as recited in claim 1 wherein the blade has two tapered portions extending between the blade first portion and the blade second portion.

7. The impeller assembly as recited in claim 6 wherein the blade second portion extends from the lower portions of the tapered portions to the edge of the blade connected to the support member.

8. The impeller assembly as recited in claim 1 wherein the support member is one of a hub and a shroud.

9. The impeller assembly as recited in claim 1 wherein the blade extends perpendicular to and radially from the support member.

10. The impeller assembly as recited in claim 1 wherein the blade is joined at the support member so as to form an angle, the angle being one of about a ninety degree angle, an obtuse angle and an acute angle.

11. The impeller assembly as recited in claim 1 wherein the impeller assembly is configured for a rotary machine which is one of a compressor, a turbine, refrigeration unit and a liquefaction unit.

12. A method of manufacturing an impeller assembly comprising the steps of:

provliding a support member with an outer surface;

forming a blade with first and second integral portions and two side walls, the blade first portion having a first thickness between the side walls and the blade second portion having a second thickness between the two side walls and an edge extending between the side walls, the second thickness being greater than the first thickness, the blade second portion having a height extending between the blade first portion and the edge, the height being greater than the second thickness;

disposing the blade edge against the support member outer surface such that the blade first portion is spaced from the support member; and connecting the blade to the support member by making at least one weld between one of the two side walls and the support member outer surface so as to form a weld joint, the weld joint having extra material for stress reduction and the thickness of the blade first portion allowing flexure away from the weld joint.

13. The manufacturing method as recited in claim 12 wherein the step of forming the blade includes forming the blade first portion on a major portion of the blade.

* * * * *